United States Patent
Axrup et al.

(10) Patent No.: US 11,724,284 B2
(45) Date of Patent: Aug. 15, 2023

(54) METHOD OF MANUFACTURING A FILM COMPRISING MICROFIBRILLATED CELLULOSE

(71) Applicant: Stora Enso OYJ, Helsinki (FI)

(72) Inventors: Lars Axrup, Hammarö (SE); Isabel Knöös, Säffle (SE); Christian Aulin, Stockholm (SE); Magnus Hillergren, Solna (SE); Tom Lindström, Sollentuna (SE); Göran Ström, Stockholm (SE)

(73) Assignee: Stora Enso OYJ, Helsinki (FI)

( * ) Notice: Subject to any disclaimer, the term of this patent is extended or adjusted under 35 U.S.C. 154(b) by 710 days.

(21) Appl. No.: 16/481,688

(22) PCT Filed: Jan. 30, 2018

(86) PCT No.: PCT/IB2018/050551
§ 371 (c)(1),
(2) Date: Jul. 29, 2019

(87) PCT Pub. No.: WO2018/138702
PCT Pub. Date: Aug. 2, 2018

(65) Prior Publication Data
US 2020/0023409 A1  Jan. 23, 2020

(30) Foreign Application Priority Data

Jan. 30, 2017 (SE) .................................... 1750069-5

(51) Int. Cl.
*D21H 11/18* (2006.01)
*D21H 21/14* (2006.01)
(Continued)

(52) U.S. Cl.
CPC ................. *B05D 7/04* (2013.01); *B05D 1/02* (2013.01); *B05D 1/30* (2013.01); *B05D 1/38* (2013.01);
(Continued)

(58) Field of Classification Search
CPC ... B05D 7/04; B05D 1/02; B05D 1/30; B05D 1/38; B05D 7/534
See application file for complete search history.

(56) References Cited

U.S. PATENT DOCUMENTS 10,138,599 B2  11/2018  Aulin et al.
2010/0024998 A1  2/2010  Wildlock et al.
(Continued)

FOREIGN PATENT DOCUMENTS

CN  101563504 A  10/2009
CN  102470647 A  5/2012
(Continued)

OTHER PUBLICATIONS

International Searching Authority, Written Opinion of the International Searching Authority, PCT/IB2018/050551, dated Jan. 30, 2018.
(Continued)

*Primary Examiner* — Dah-Wei D. Yuan
*Assistant Examiner* — Kristen A Dagenais
(74) *Attorney, Agent, or Firm* — Greer, Burns & Crain, Ltd.

(57) ABSTRACT

The method of the invention relates to a method of manufacturing a fibrous, oxygen barrier film by casting a suspension comprising microfibrillated cellulose onto a non-porous substrate in a number of subsequent steps with intermediate drying. The invention enables an efficient method to manufacture an MFC film by casting technology without the problems of cracks or voids formed in the film. By applying
(Continued)

the MFC in several layers, with in-between drying, the distance the water has to diffuse through is shorter, whereby the evaporation is more efficient and the film properties are not negatively affected by the drying.

18 Claims, 2 Drawing Sheets

(51) Int. Cl.
*D21H 23/50* (2006.01)
*B05D 7/04* (2006.01)
*B05D 1/02* (2006.01)
*B05D 1/30* (2006.01)
*B05D 1/38* (2006.01)
*B05D 7/00* (2006.01)
*C08J 5/18* (2006.01)
*C09D 101/02* (2006.01)

(52) U.S. Cl.
CPC ............... *B05D 7/534* (2013.01); *C08J 5/18* (2013.01); *C09D 101/02* (2013.01)

(56) References Cited

U.S. PATENT DOCUMENTS

| | | | |
|---|---|---|---|
| 2012/0094047 A1 | 4/2012 | Albertson et al. | |
| 2012/0237761 A1* | 9/2012 | Mukai | C08J 5/18 428/323 |
| 2012/0298319 A1 | 11/2012 | Fujiwara | |
| 2013/0209772 A1 | 8/2013 | Sandström et al. | |
| 2014/0255688 A1 | 9/2014 | Salminen et al. | |
| 2015/0225590 A1* | 8/2015 | Iotti | C09D 101/04 106/217.6 |
| 2015/0315747 A1 | 11/2015 | Heiskanen et al. | |
| 2016/0176989 A1 | 6/2016 | Laukkanen et al. | |
| 2018/0245286 A1 | 8/2018 | Heiskanen et al. | |

FOREIGN PATENT DOCUMENTS

| | | |
|---|---|---|
| CN | 105492689 A | 4/2016 |
| CN | 107208378 A | 9/2017 |
| EP | 2771390 A2 | 9/2014 |
| JP | 2007023218 A1 | 2/2007 |
| JP | 2013533899 A | 8/2013 |
| JP | 2015502835 A | 1/2015 |
| JP | 2016159576 A | 9/2016 |
| JP | 2018527476 A | 9/2018 |
| WO | 2011056130 A1 | 5/2011 |
| WO | 2013060934 A2 | 5/2013 |
| WO | 2014044870 A1 | 3/2014 |

OTHER PUBLICATIONS

International Searching Authority, International Search Report, PCT/IB2018/050551, dated Jan. 30, 3018.

Chinga-Carrasco, G. et al., "On the structure and oxygen transmission rate of biodegradable cellulose nonobarriers," Nanoscale Research Letters 2012,7:192, http://www.nanoscalereslett.com/content/7/1/192, pp. 1-6.

Lavoine, N. et al., "Microfibrillated cellulose—Its barrier properties and applications in cellulosic materials: A review," Carbohydrate Polymers 90 (2012), pp. 735-764.

Rodionova, G. et al., "The Formation and Characterization of Sustainable Layered Films Incorporating Microfibrillated Cellulose (MFC)," BioResources 7(3), pp. 3690-3700.

Shimizu, M. et al., "Water-resistant and high oxygen-barrier nanocellulose films with interfibrillar cross-linkages formed through multivalent metal ions," Journal of Membrane Science 500 (2016), pp. 1-7.

Chinga-Carrasco, G., "Cellulose fibres, nanofibrils and microfibrils: The morphological sequence of MFC components from a plant physiology and fibre technology point of view," Nanoscale Research Letters 2011, 6:417, pp. 1-7.

Fengel, D., "Ultrastructural behavior of cell wall polysaccharides," Tappi J., Mar. 1970, vol. 53, No. 3.

* cited by examiner

METHOD OF MANUFACTURING A FILM COMPRISING MICROFIBRILLATED CELLULOSE

This application is a U.S. National Phase under 35 U.S.C. § 371 of International Application No. PCT/IB2018/050551, filed Jan. 30, 2018, which claims priority under 35 U.S.C. §§ 119 and 365 to Swedish Application No. 1750069-5, filed Jan. 30, 2017.

FIELD OF INVENTION

The present invention relates to a method of manufacturing a fibrous-based oxygen barrier film. The invention further covers films made by the method and uses thereof.

BACKGROUND OF THE INVENTION

An effective gas and/or aroma barrier and particularly oxygen barrier is required in packaging industry for shielding products that are oxygen-sensitive, thereby extending their shelf-life. These include many food products, in particular, but also pharmaceutical products and in electronic industry products. Known packaging materials with oxygen barrier properties may be comprised of one or several polymer films or of a fibrous paper or board coated with one or several layers of an oxygen barrier polymer, usually as part of a multilayer coating structure.

More recently, microfibrillated cellulose (MFC) films, in which defibrillated cellulosic fibrils have been suspended e.g. in water, re-organized and rebonded together forming a film that is predominantly continuous good gas barrier properties have been developed.

Such films may be made by applying an MFC suspension on a porous substrate forming a web followed by dewatering of the web by draining water through the substrate for forming the film. This can be accomplished e.g. by use of a paper- or paperboard machine type of process. US2012298319A teaches a method of manufacturing of an MFC film by applying a furnish comprising MFC directly on porous substrate thus allowing the MFC to be dewatered and filtered.

Alternatively, the film can be made by use of casting technologies, including applying an MFC dispersion onto a non-porous cast substrate, such as a polymeric or metal substrate, and drying said film by evaporation. The advantages of this technology include uniform thickness distribution and smoother surface of the film. The publication EP 2771390 A4 describes preparation of MFC films, in which an aqueous cellulose nanofiber dispersion is coated on a paper or polymeric substrate, dried and finally peeled off as a nanofiber film sheet.

One problem connected with the cast process is that when the film is forming in the drying step, the slow diffusion of water restricts the drying rate. The diffusion of water vapor through the film is a slow process which has a negative impact on the process efficiency. If the drying speed is increased, voids or even cracks may be formed in the film deteriorating its properties. A further problem with the cast process is the formation of shrink tensions in the formed film which may have a negative impact on its strength properties, such as strain at break or tensile strength.

Films made from MFC further need to comprise quite a large amount of plasticizers in order to exhibit the required stretchability. There is a need to limit the amount of plasticizers, especially in films to be used in connection with food packages in order to comply with stipulated laws and regulations. Moreover, a high amount of plasticizers may deteriorate the mechanical and barrier properties of the film.

SUMMARY OF THE INVENTION

It is an object of the present disclosure to enable the manufacturing of a thin MFC film with high strength and barrier properties and an improved stretchability, while avoiding the aforementioned problems connected to the drying of the film and the use of a large amount of plasticizers. It is a further object of the invention to provide a more cost efficient method of manufacturing such a thin MFC film.

These objects, and further advantages, are wholly or partially achieved by the suggested method, the film and the use thereof according to the appended independent claims. Embodiments are set forth in the appended dependent claims, and in the following description.

The method of the invention relates to a method of manufacturing a fibrous, oxygen barrier film comprising the steps of:
  providing at least a first and a second suspension each comprising microfibrillated cellulose (MFC) in an amount of at least 50 weight % (wt %) calculated on the total solids content of said suspension,
  applying said first suspension on a non-porous substrate to form a first web,
  drying said first web to a solids content of at least 50 wt % (calculated on the total weight of said web) in an intermediate drying step,
  applying said second suspension comprising microfibrillated cellulose (MFC) onto the surface of said dried first web to form a second web,
  drying the web, comprising said first and second web, in a final drying step to form a film having a basis weight of less than 40 g/m2 and an Oxygen Transmission Rate (OTR) value of below 10 ml/m$^2$/per 24 h at 50% RH, preferably below 5 ml/m$^2$/per 24 h at 50% RH or even below 2 ml/m$^2$/per 24 h at 50% RH.

The invention enables an efficient method to manufacture an MFC film by casting technology without the problems of cracks or voids formed in the film. By applying the MFC in several layers, with in-between drying, the distance the water has to diffuse through the film is shorter, whereby the evaporation is more efficient and the film properties are not negatively affected by the drying process. In this way, the drying rate can be increased which further improves the production efficiency. The method may further comprise a step of drying said second web in a second intermediate drying step and a step of applying a third suspension, comprising microfibrillated cellulose (MFC) in an amount of at least 50 wt % calculated on the total solids content of said suspension, onto said dried second web prior to the final drying step. The method may comprise applying a predetermined number of suspensions comprising microfibrillated cellulose in an amount of at least 50 weight % onto a substrate in at least four, or at least five, or at least six subsequent steps, preferably at least 8 subsequent steps, with intermediate drying steps, prior to the final drying step. The higher number of layers applied to build up the desired thickness, the more even the thickness of the film will be. This has a positive impact on the barrier properties of the film.

In one embodiment, the web is dried to a solids content of between 50-95 wt %, preferably between 50-75 wt %, most preferably between 60-70 wt %, in the intermediate drying step/s prior to the step of applying a subsequent suspension onto the web. Thus, the first web is dried to such solids content before the application of a second web, and the potential first and second web is dried to such solids content before the application of a third web etc.

The drying of the web in the intermediate drying step/s, e.g. the first web, before the application of a subsequent web may be performed by use of drying methods well known in the art, e.g. by use of hot air, IR, microwaves, roll drying or by thermal heating of the substrate.

The total drying time, including intermediate and final drying steps, is preferably less than 5 minutes, more preferably less than 3 minutes, which renders the method efficient.

The suspensions, i.e. the first and second suspension or the pre-determined number of suspensions, preferably have a dry content of at least 3.5 wt %, more preferably at least 5 wt %, or at least 15 wt %, most preferably between 15-30 wt % or between 15-25 wt %. The method of the invention makes it possible to use such high dry contents, which involves savings in terms of energy consumption and enables even higher drying rates.

The suspensions, i.e. the first and the second suspension or the pre-determined number of suspensions, are preferably applied on the substrate by use of a non-impact coating technology, such as spraying or curtain coating. However, the most preferred application method is spray coating, since this application method efficiently avoids destruction of a previous formed layer and enables the use of high dry contents.

In one preferred embodiment of the invention at least one of the suspensions, i.e. the first and/or second suspension or one or several of the number of suspensions, comprises a plasticizer in an amount of less than 30 wt %, preferably less than 15 wt %, or less than 10 wt %, 5 wt %, 1 wt % or even less than 0.1 wt %, all percentages calculated on the total amount of solids in the suspension. In one embodiment, all of the suspensions forming the film comprise plasticizer in an amount of less than 30 wt %, preferably less than 15 wt %, or less than 10 wt %, 5 wt %, 1 wt % or even less than 0.1 wt %, all percentages calculated on the total amount of solids in the suspension. The suspensions forming the film may comprise no plasticizers at all.

In one embodiment, at least one of the suspensions comprises chemically modified microfibrillated cellulose.

In a second aspect the invention relates to a fibrous-based oxygen barrier film, preferably made by the method according to the invention, which film comprises plasticizers in an amount of less than 10 wt %, preferably less than 5 wt % or less than 0.1 wt %, all wt % calculated on the total weight of said dried film. Said film further exhibits:

a basis weight of less than 40 g/m², preferably less than 35 g/m², an Oxygen Transmission Rate (OTR) value of below 10, preferably below 5 or even below 2 ml/m²/per 24 h at 50% RH and a strain at break value of at least 3.5%, preferably at least 4%

Said film provides extraordinary oxygen barrier and strength properties.

The film may further be characterized by features appearing in the embodiments related to the first aspect.

In a third aspect, the invention relates to the use of the film in food or liquid packaging applications.

DETAILED DESCRIPTION

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water.

The cellulose fiber is preferably fibrillated to such an extent that the final specific surface area of the formed MFC is from about 1 to about 300 m²/g, such as from 1 to 200 m²/g or more preferably 50-200 m²/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofbril (CNF) defining a cellulose nanofbire material containing multiple elementary fibrils with both crystalline and amorphous regions, having a high aspect ratio with width of 5-30 nm and aspect ratio usually greater than 50.

The oxygen transmission rate (OTR) as used in the patent claims and in the description is measured in accordance with (ASTM D 3985-05), in 24 hours at 23°, 50% RH.

Tensile tests of the MFC films were conducted using an MTS tensile tester with a Teststar IIS controller (MTS, USA). The tensile tester was equipped with a 500 N load cell. At test, the cross head speed was 5 mm/min. Measurements were made at 23° C. and 50% RH on films conditioned at least 48 hours prior to testing. At least 7 samples were cut out of each film and tested. During testing the sample clamping length and width was 30 mm and 6.1 mm, respectively. Special attention was paid to ensure that the samples did not slip in the clamps during testing. Mechanical properties such as strength index, stiffness index and strain at break (as used throughout the description and in the claims) were determined from the measured stress-strain curves.

The term "plasticizers" as used herein is meant additives that increase the plasticity of the film. Plasticizers used in the process of the invention can e.g. be chosen from the group of sugar alcohols such as sorbitol, polyols, such as glycerol, polyethers, such as polyethylene glycol (PEG), cellulose derivatives, such as carboxy methyl cellulose (CMC), or a combination of any of these.

The invention discloses a method of manufacturing MFC films by subsequently applying a number of suspensions comprising microfibrillated cellulose as the main component onto a non-porous substrate. The film is thus built up by several webs/layers of MFC. The suspensions comprises at least 50 wt % MFC calculated on the total solids content of the suspensions, the remainder being conventional additives such as e.g. longer fibers, fillers (such as clay), binders, such as PVOH or PVAC, dispersing agents or softeners etc. The suspensions building up the film preferably are applied at a consistency of at least 5 wt %, preferably at least 15 wt %, preferably at least 20 wt %, or between 15-30 wt % or between 15-25 wt %. Each suspension is preferably applied in an amount to form a web of between 3-6 gsm, preferably 4-5 gsm. The non-porous substrate on which the film is formed has a smooth surface and may, e.g. be a metal belt or a polymer substrate. The method further comprise drying of each applied web before the application of a subsequent web. Each web is dried to a dry content of at least 50 wt %, preferably between 50-95 or between 50-75 wt %, most preferably between 60-70 wt % before the application of a subsequent web. After the application of the last layer/web, the web is dried to a final moisture content preferably of between 0.1-20 wt % to form said film. The drying of the film, both in-between the application of subsequent webs and the final drying, may be accomplished by non-contact drying using e.g. hot air, IR or microwaves.

The invention provides an efficient method to produce an MFC film by cast coating technologies without the problems with cracks or voids formed in the film connected to prior art methods. Furthermore, it has surprisingly been found that an MFC film with required stretchability may be formed with only a limited amount (such as less than 10 wt % based on total solid amount), or no addition of plasticizers.

The method of the invention enables the use of different kind of fibers in different layers, which opens up the possibility to build up an optimized barrier structure. In one embodiment, at least one of the suspensions comprises chemically modified microfibrillated cellulose. The film may e.g. be built up by at least one layer (e.g. a first web) comprising one type of modified MFC and another layer (e.g. a second web) comprising another type or non-modified MFC.

The MFC film formed by the method described has preferably a basis weight of 10-40 g/m2, or 20-40 g/m$^2$, or 20-30 g/m$^2$ and a thickness preferably of below 50 μm or below 40 μm, preferably in the range of 20-40 μm. In one preferred embodiment, the basis weight of the film is between 10-20 g/m$^2$. It has been shown that by use of the method of the invention, such thin films can be produced which films still exhibit high oxygen barrier properties.

According to one embodiment of the invention, the density of the film may be in the range of from 750 kg/m$^3$ to 1550 kg/m$^3$. According to one embodiment the density is higher than 750 kg/m$^3$, according to an alternative the density is higher than 950 kg/m$^3$, and according to yet an alternative embodiment the density is higher than 1050 kg/m$^3$. The film may thus be a so called dense film.

The film as described above is as such useful for packaging foods or liquids.

The film may alternatively be used as an MFC film layer in a multilayer laminate. Thus, the film may be applied onto a fibrous base, such as a paper, paperboard or cardboard made of chemical or (chemi-) mechanical pulp. Preferably the fibrous base is paperboard of a weight of 130 to 250 g/m2, preferably of 200 to 250 g/m2, or paper of a weight of 40 to 130 g/m2. The laminate may further comprise polymer layers, e.g. of polyethylene, or further barrier layers. Such laminates are useful e.g. for is useful e.g. for heat-sealable packages of food or liquids.

EXAMPLE

In a first test series, four (4) MFC films were produced, each comprising ten (10) layers. Said films were formed by airless spraying technology from aqueous suspensions, each comprising 100 wt % MFC as calculated on the total solids content of said suspension. The total solids content in each aqueous suspension was 3.5 wt %. Said suspensions were casted by the use of airless spraying on a non-porous stainless steel substrate in ten (10) subsequent steps. In each step, a layer was formed, whereafter said layer was dried by evaporation to a dry content of around 90% by weight before a subsequent layer was applied onto the surface of said dried, previous layer. After the application of the last layer, the web was dried to a final dry content of 95 wt %. In addition, three reference films were formed by casting only one layer of MFC at 3.5% solids content by weight in a single step onto said non-porous substrate, followed by drying to a final dry content of 95 wt %. The grammage of each of the 7 films produced were 30 gsm after drying.

FIG. 1 shows the evaporation rate of water vs. temperature for each film. As can be seen in the figure, the total evaporation rate is dramatically increased when applying ten (10) layers instead of one (1), to achieve a grammage of total 30 gsm after drying.

In addition, the strain at break was highly improved when casting several layers in accordance with the method of the invention.

A second test was performed where films were formed by multiple 4 to 19 layers of different thicknesses to a total grammage of 40 gsm. This second test was performed in accordance with the method described above in connection with the first test series, with the difference that the solids content of each aqueous suspension was 5.4 wt %. An increased number of layers significantly increased the strain at break as shown in FIG. 2.

In a third test, a first, a second and a third MFC film were produced in accordance with the method described in connection with the first test series, with the difference that the solids contents of the suspensions used to form the films were varied. The solids content of the suspension to form the first film was 1.6 wt %, the solids content of the suspension to form the second film was 3.20 wt % and the solids content of the suspension to form the third film was 5.30 wt %.

FIG. 3 shows the amount of water evaporated from 1 kg film after drying the films to a final dry content of around 95 wt % in accordance with the invention. As can be seen in the figure, films made from suspensions of higher solids contents need much less drying (less amount of water evaporated) to achieve the final solids content. FIG. 4 shows the strain at break for said first, second and third MFC film. As can be seen in FIG. 4, the strain at break is surprisingly unaffected by the solids content of the suspensions used to form the films.

The invention claimed is:

1. A method of manufacturing a fibrous, oxygen barrier film comprising the steps of:
    providing at least a first and a second suspension each comprising microfibrillated cellulose (MFC) in an amount of at least 50 wt % calculated on the total solids content of said suspension,
    applying said first suspension on a non-porous substrate to form a first web,
    drying said first web to a solids content of at least 50 wt % in an intermediate drying step,
    applying said second suspension comprising microfibrillated cellulose (MFC) onto the surface of said dried first web to form a second web,
    drying the web, comprising said first and second web, in a final drying step to form a film having a basis weight of less than 40 g/m² and an Oxygen Transmission Rate (OTR) value of below 10 ml/m²/per 24 h at 50% RH.

2. A method according claim 1 further comprising drying said second web in a second intermediate drying step and applying a third suspension, comprising microfibrillated cellulose (MFC) in an amount of at least 50 wt % calculated on the total solids content of said suspension, onto said dried second web prior to the final drying step.

3. A method according to claim 1, wherein the method comprises applying a predetermined number of suspensions comprising microfibrillated cellulose in an amount of at least 50 wt % onto a substrate in at least six subsequent steps, with intermediate drying steps, prior to the final drying step.

4. A method according to claim 1, wherein the web is dried to a solids content of between 50-95 wt %, in the intermediate drying step/s prior to the step of applying a subsequent suspension onto the web.

5. A method according to claim 1, wherein the total drying time, including intermediate and final drying steps, is less than 5 minutes.

6. A method according claim 1, wherein each suspension has a solids content of at least 5 wt %.

7. A method according to claim 1, wherein each suspension has a solids content of between 15-30 wt %.

8. A method according to claim 1, wherein the suspensions are applied by use of a non-impact coating technology.

9. A method according to claim 1, wherein at least one of the suspensions comprises plasticizer in an amount of less than 30 wt %, all percentages calculated on the total amount of solids in the suspension.

10. A method according to claim 1, wherein at least one of the suspensions comprises chemically modified microfibrillated cellulose.

11. A method according to claim 1, wherein the web is dried to a solids content of between 50-75 wt %, in the intermediate drying step/s prior to the step of applying a subsequent suspension onto the web.

12. A method according to claim 1, wherein the web is dried to a solids content of between 60-70 wt % in the intermediate drying step/s prior to the step of applying a subsequent suspension onto the web.

13. A method according to claim 1, wherein the total drying time, including intermediate and final drying steps, is less than 3 minutes.

14. A method according to claim 1, wherein each suspension has a solids content of at least 15 wt %.

15. A method according to claim 1, wherein each suspension has a solids content of between 15-25 wt %.

16. A method according to claim 1, wherein at least one of the suspensions comprises plasticizer in an amount of less than 15 wt %, all percentages calculated on the total amount of solids in the suspension.

17. A method according to claim 1, wherein at least one of the suspensions comprises plasticizer in an amount of less than 10 wt %, all percentages calculated on the total amount of solids in the suspension.

18. A method according to claim 1 wherein the film has a percent strain at failure greater than a percent strain at failure of a film made of a single layer.

* * * * *

UNITED STATES PATENT AND TRADEMARK OFFICE
CERTIFICATE OF CORRECTION

| | | |
|---|---|---|
| PATENT NO. | : 11,724,284 B2 | Page 1 of 1 |
| APPLICATION NO. | : 16/481688 | |
| DATED | : August 15, 2023 | |
| INVENTOR(S) | : Lars Axrup et al. | |

It is certified that error appears in the above-identified patent and that said Letters Patent is hereby corrected as shown below:

In the Specification

Add a section at Column 3, after Line 62:

Figure 1:
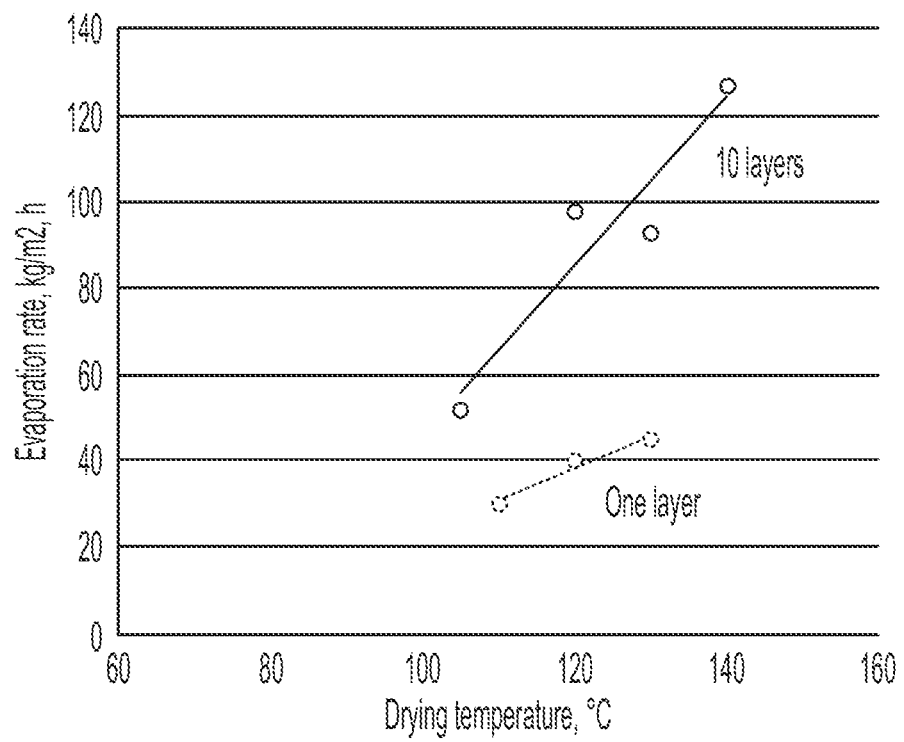
Fig. 1 is a graph showing the evaporation rate of water vs. temperature for a one layer and ten layer films.
Figure 2:
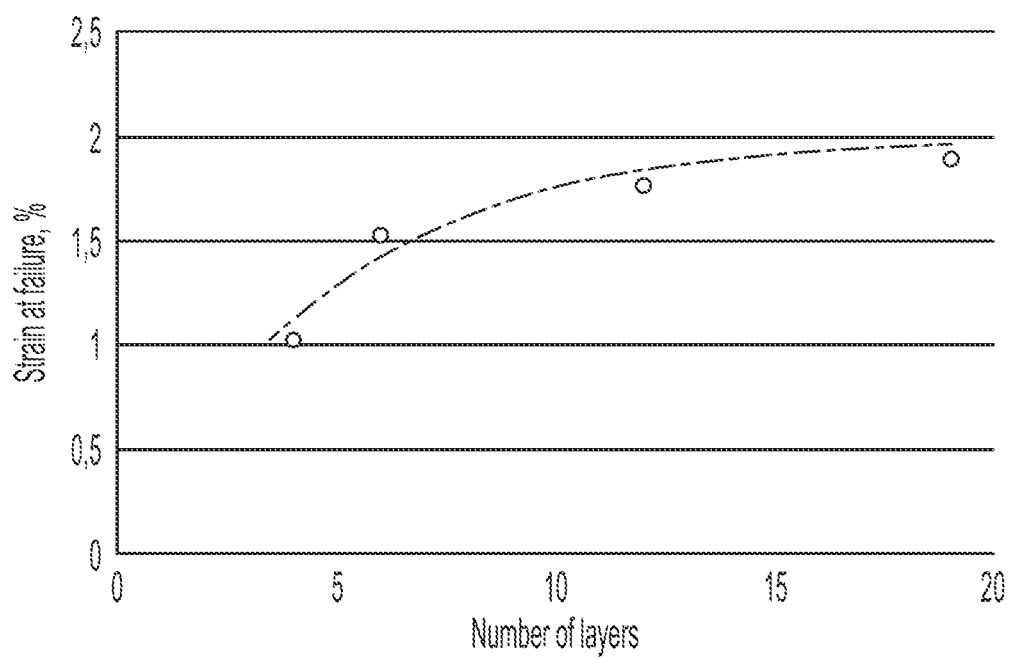
Fig. 2 is a graph showing the strain at break v. number of layers.
Figure 3:
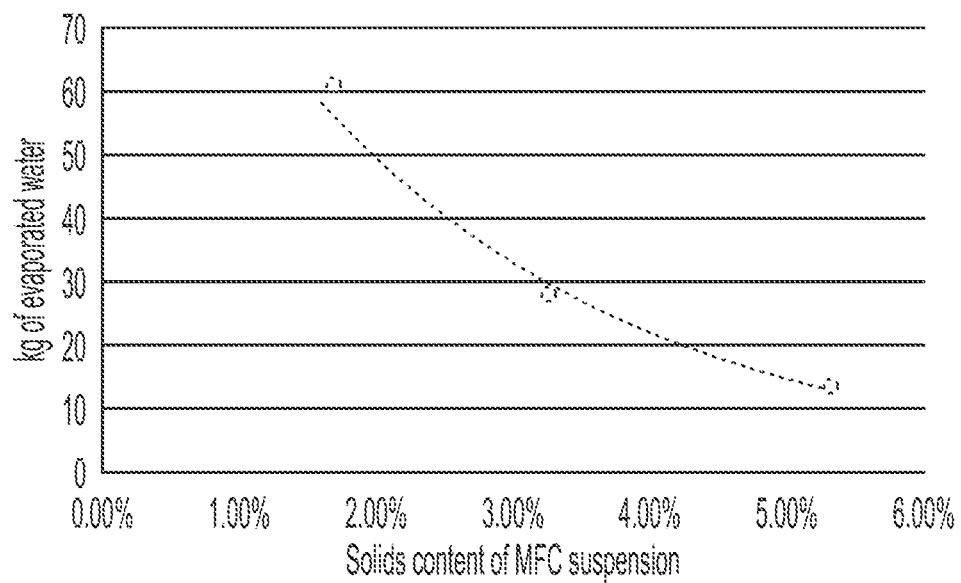
Fig. 3 is a graph showing the amount of water evaporated v. the solids content of the MFC suspension.
Figure 4:
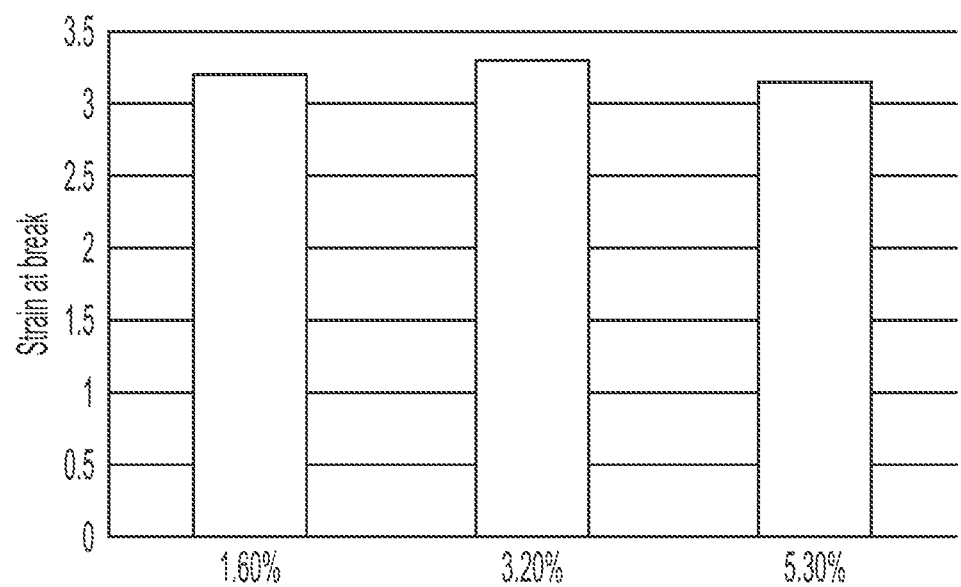
Fig. 4 is a graph showing the strain at break for films made from MFC suspensions having different solids content.

Signed and Sealed this
Nineteenth Day of September, 2023

*Katherine Kelly Vidal*

Katherine Kelly Vidal
*Director of the United States Patent and Trademark Office*